(12) United States Patent
Takamoto et al.

(10) Patent No.: US 6,275,343 B1
(45) Date of Patent: Aug. 14, 2001

(54) PROJECTION OPTICAL SYSTEM

(75) Inventors: Katsuhiro Takamoto; Jun Nishikawa, both of Sakai (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/550,911

(22) Filed: Apr. 17, 2000

(30) Foreign Application Priority Data

Apr. 20, 1999 (JP) .............................................. H11-112361

(51) Int. Cl.[7] .............................. G02B 9/00; G02B 13/04
(52) U.S. Cl. ....................... 359/749; 359/649; 359/750; 359/751
(58) Field of Search ................................... 359/749–753, 359/649–651

(56) References Cited

U.S. PATENT DOCUMENTS

| | | | | |
|---|---|---|---|---|
| 5,442,484 | * | 8/1995 | Shikawa ............................. | 359/651 |
| 5,666,228 | | 9/1997 | Yamamoto ........................ | 359/651 |
| 5,745,297 | | 4/1998 | Kaneko et al. ................... | 359/651 |
| 6,084,719 | * | 7/2000 | Sugawara et al. ............... | 359/651 |

FOREIGN PATENT DOCUMENTS

| | | |
|---|---|---|
| 07270680 | 10/1995 | (JP) . |
| 10142503 | 5/1998 | (JP) . |
| 10170824 | 6/1998 | (JP) . |

* cited by examiner

*Primary Examiner*—Scott J. Sugarman
(74) *Attorney, Agent, or Firm*—Burns, Doane, Swecker & Mathis, LLP

(57) ABSTRACT

A projection optical system has, from the enlargement side to the reduction side, a first, a second, and a third lens unit, and an aperture diaphragm. The negatively-powered first lens unit includes only a negative lens element and has at least one aspherical surface. The positively-powered second lens unit includes at least one positive lens element. The positively-powered third lens unit includes a lens element. The aperture diaphragm is disposed at the front focal point of the third lens unit. The lens element of the third lens unit is made of a material of which anomalous partial dispersibility and Abbe number are defined.

8 Claims, 11 Drawing Sheets

FNO=3.00

-0.2  0.2
SPHERICAL  SINE
ABERRATION  CONDITION

— d
—·— g
—··— c
—--- SC

Y'=11.1

-0.2  0.2
ASTIGMATISM

---- DM
—— DS

Y'=11.1

-1.0  1.0
DISTORTION %

FNO=3.00

-0.2  0.2
SPHERICAL  SINE
ABERRATION  CONDITION

— d
—·— g
—··— c
—--- SC

Y'=12.7

-0.2  0.2
ASTIGMATISM

---- DM
—— DS

Y'=12.7

-1.0  1.0
DISTORTION %

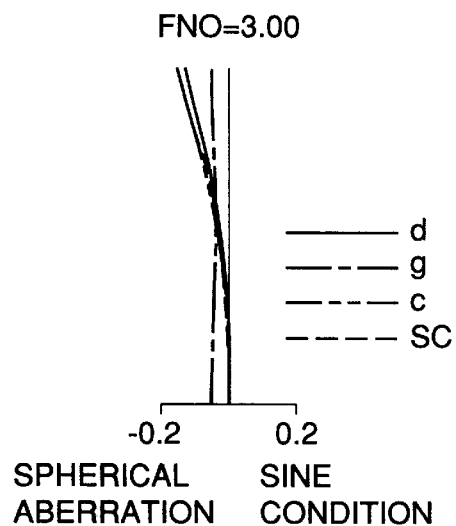
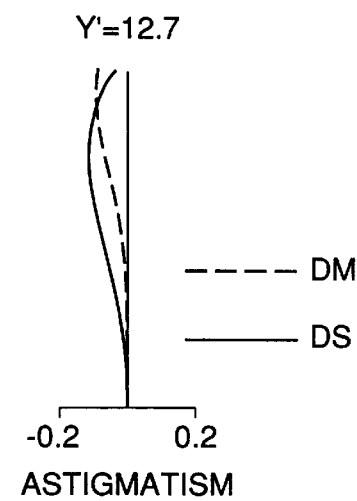
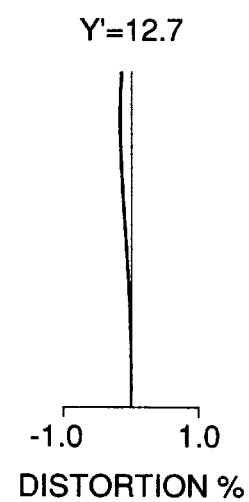
FIG. 13A — FNO=3.00 — SPHERICAL ABERRATION / SINE CONDITION (d, g, c, SC)
FIG. 13B — Y'=12.7 — ASTIGMATISM (DM, DS)
FIG. 13C — Y'=12.7 — DISTORTION %
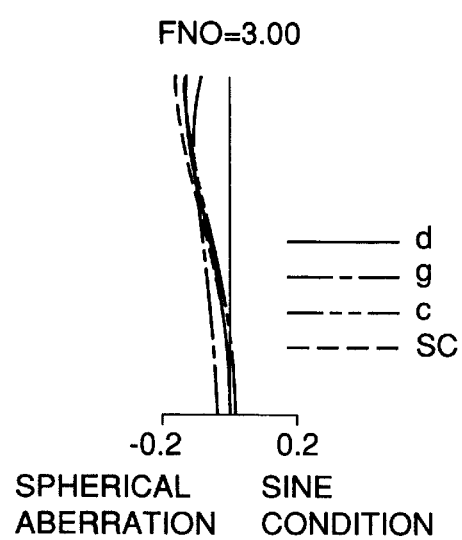
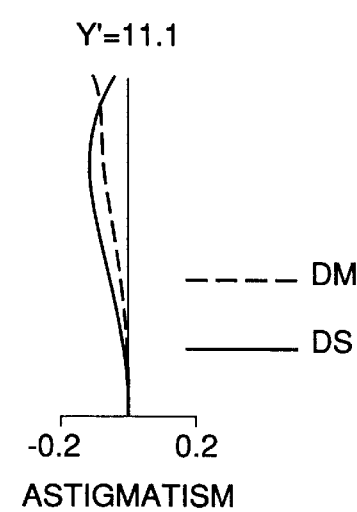
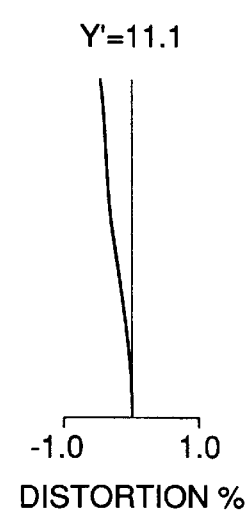
FIG. 14A — FNO=3.00 — SPHERICAL ABERRATION / SINE CONDITION (d, g, c, SC)
FIG. 14B — Y'=11.1 — ASTIGMATISM (DM, DS)
FIG. 14C — Y'=11.1 — DISTORTION %

FNO=3.00
-0.2  0.2
SPHERICAL ABERRATION
SINE CONDITION
— d
—·— g
——— c
———— SC

Y'=11.1
-0.2  0.2
ASTIGMATISM
———— DM
——— DS

Y'=11.1
-1.0  1.0
DISTORTION %

FNO=3.00
-0.2  0.2
SPHERICAL ABERRATION
SINE CONDITION
— d
—·— g
——— c
———— SC

Y'=10.1
-0.2  0.2
ASTIGMATISM
———— DM
——— DS

Y'=10.1
-1.0  1.0
DISTORTION %

FNO=3.00
SPHERICAL ABERRATION
SINE CONDITION

Y'=10.1
ASTIGMATISM

Y'=10.1
DISTORTION %

FNO=2.75
SPHERICAL ABERRATION
SINE CONDITION

Y'=10.7
ASTIGMATISM

Y'=10.7
DISTORTION %

FNO=3.00

—— d
—·— g
—— c
—— SC

-0.2  0.2
SPHERICAL  SINE
ABERRATION  CONDITION

Y'=10.1

—— DM
—— DS

-0.2  0.2
ASTIGMATISM

Y'=10.1

-1.0  1.0
DISTORTION %

FNO=3.00

—— d
—·— g
—— c
—— SC

-0.2  0.2
SPHERICAL  SINE
ABERRATION  CONDITION

Y'=12.5

—— DM
—— DS

-0.2  0.2
ASTIGMATISM

Y'=12.5

-1.0  1.0
DISTORTION %

PROJECTION OPTICAL SYSTEM

This application is based on application No. H11-112361 filed in Japan on Apr. 20, 1999, the entire content of which is hereby incorporated by reference.

FIELD OF THE INVENTION

The present invention relates to a projection optical system, and more particularly to a projecting optical system that projects images displayed on a display device such as a liquid crystal device, a digital micromirror device (hereafter referred to as the "DMD"), or the like, onto a screen.

BACKGROUND OF THE INVENTION

In recent years, as personal computers become prevalent, as a presentation tool in business and other scenes, image projectors have been coming into wider and wider use that project images displayed on a display device (such as a liquid crystal device, a DMD, or the like) onto a screen. Moreover, an increasing demand is prospected for projectors that can be used as home-use projecting apparatuses (for example, projectors fit for realizing so-called home theaters or those fit for use with a digital television system). For such uses, single-panel or three-panel liquid crystal projectors and DMD projectors (having about 100,000 to 300,000 pixels) have conventionally been developed.

Projection optical systems for use in such projectors are proposed in U.S. Pat. Nos. 5,745,297 and 5,666,228, and Japanese Laid-open Patent Applications Nos. H10-142503 and H10-170824. The projection optical systems proposed in the above-mentioned patent applications have half angle of view of about 40° and offer satisfactory optical performance as long as they are used to project images obtained from conventional display devices. However, these projection optical systems do not achieve sufficient reduction of aberrations (lateral chromatic aberration, in particular) as is required to properly project images obtained from higher-resolution display devices. On the other hand, as a projection optical system that offers higher projection performance, a retrofocus-type lens system is known that is proposed in Japanese Laid-open Patent Application No. H7-270680. This projection optical system is so designed that lateral chromatic aberration is suppressed by the use of a positive lens element made of anomalous-dispersion glass included in the rear lens unit. However, this projection optical system has, for example, half angle of view of about 20 to 28 degrees and an F number of 4.5. This fact shows that it fails to offer sufficiently high optical performance.

Nowadays, higher and higher image quality has been sought after in projectors than ever. For example, for presentation purposes, projectors having resolutions higher than 1024×768 dots (XGA) are preferred to those having resolutions of 800×600 dots (SVGA). Even in home-use projectors, horizontal resolutions higher than 400 scan lines are in demand, now that high-definition television services such as Japan's Hi-Vision have gone into operation. To satisfy such requirements for higher image quality, display devices such as liquid crystal devices or DMDs have come to offer increasingly high resolutions. In addition, to make projectors as compact as possible, display devices such as liquid crystal devices and DMDs are made smaller and smaller.

To achieve proper projection of images obtained from such a display device that has a smaller size and offers a higher resolution, it is essential to use a projection optical system that offers higher optical performance than ever. However, as noted previously, conventional projection optical systems do not offer sufficiently high optical performance (in particular, lateral chromatic aberration correction performance) as desired. Moreover, in particular, projection optical systems designed for use in home-use projectors need to be made as low-cost as possible. However, in conventional projection optical systems, higher optical performance cannot be achieved without increasing manufacturing cost.

SUMMARY OF THE INVENTION

An object of the present invention is to provide a low-cost projection optical system in which aberrations are satisfactorily corrected so that it can project images obtained from a small-sized, high-resolution display device.

To achieve the above object, according to one aspect of the present invention, a projection optical system is provided with, from the enlargement side to the reduction side, a first lens unit, a second lens unit, a third lens unit, and an aperture diaphragm. The first lens unit has a negative optical power, includes only a negative lens element, and has at least one aspherical surface. The second lens unit has a positive optical power and includes at least one positive lens element. The third lens unit has a positive optical power and includes a lens element. The aperture diaphragm is disposed at the front focal point of the third lens unit. In this projection optical system, the lens element of the third lens unit fulfills the following conditions:

$$0.015 < \Theta - (0.644 - 0.00168 \cdot vd) < 0.06$$

$$65 < vd < 100$$

where $\Theta = (ng-n)/(nF-nC)$ $vd = (nd-1)/(nF-nC)$ ng represents the refractive index for g-line (wavelength is 435.84 nm);

nF represents the refractive index for F-line (wavelength is 486.13 nm);

nd represents the refractive index for d-line (wavelength is 587.56 nm); and nC represents the refractive index for C-line (wavelength is 656.28 nm).

According to another aspect of the present invention, a projection optical system is provided with, from the enlargement side to the reduction side, a first lens unit, a second lens unit, a third lens unit, and an aperture diaphragm. The first lens unit has a negative optical power, includes only a negative lens element, and has at least one aspherical surface. The second lens unit has a positive optical power and includes at least one positive lens element. The third lens unit has a positive optical power and includes a lens element. The aperture diaphragm is disposed at the front focal point of the third lens unit. In this projection optical system, the lens element of the third lens unit fulfills the following conditions:

$$2.5 < f2/f0 < 5$$

$$2.5 < f12/f0 < 13$$

where f0 represents the focal length of the entire projection optical system;

f2 represents the focal length of the second lens unit; and f12 represents the composite focal length of the first and second lens units.

BRIEF DESCRIPTION OF THE DRAWINGS

This and other objects and features of this invention will become clear from the following description, taken in conjunction with the preferred embodiments with reference to the accompanied drawings in which:

FIGS. 13A to 13C are graphic representations of the aberrations observed in the projection optical system of Example 3;

FIGS. 14A to 14C are graphic representations of the aberrations observed in the projection optical system of Example 4;

DESCRIPTION OF THE PREFERRED EMBODIMENTS

Figure 1:
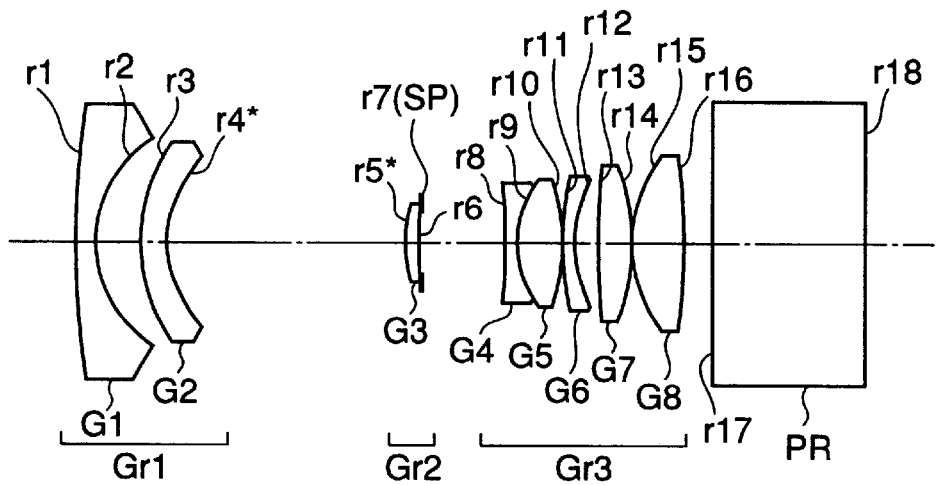
FIG. 1 is a lens arrangement diagram of the projection optical system of a first embodiment (Example 1) of the present invention.
Figure 2:
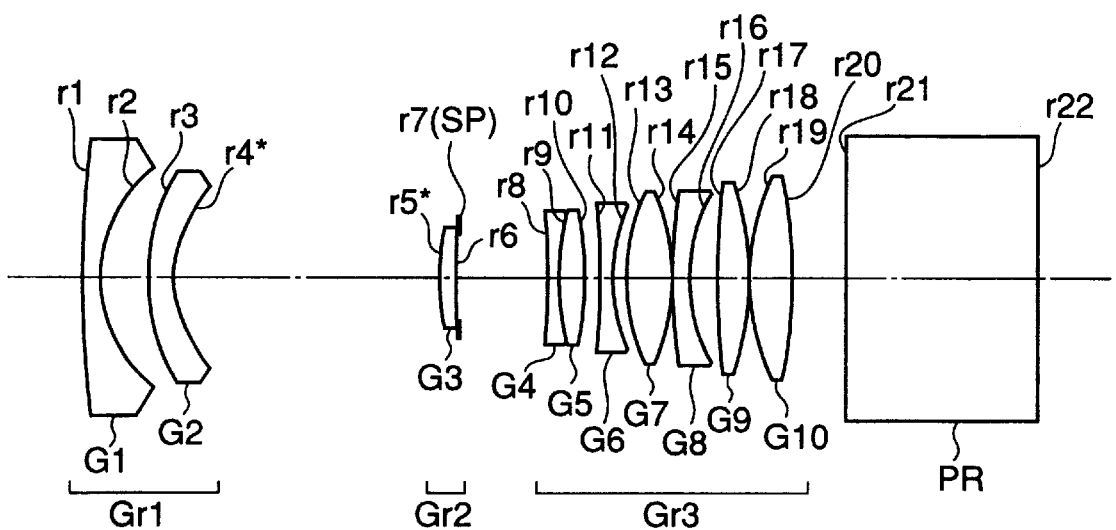
FIG. 2 is a lens arrangement diagram of the projection optical system of a second embodiment (Example 2) of the present invention.
Figure 3:
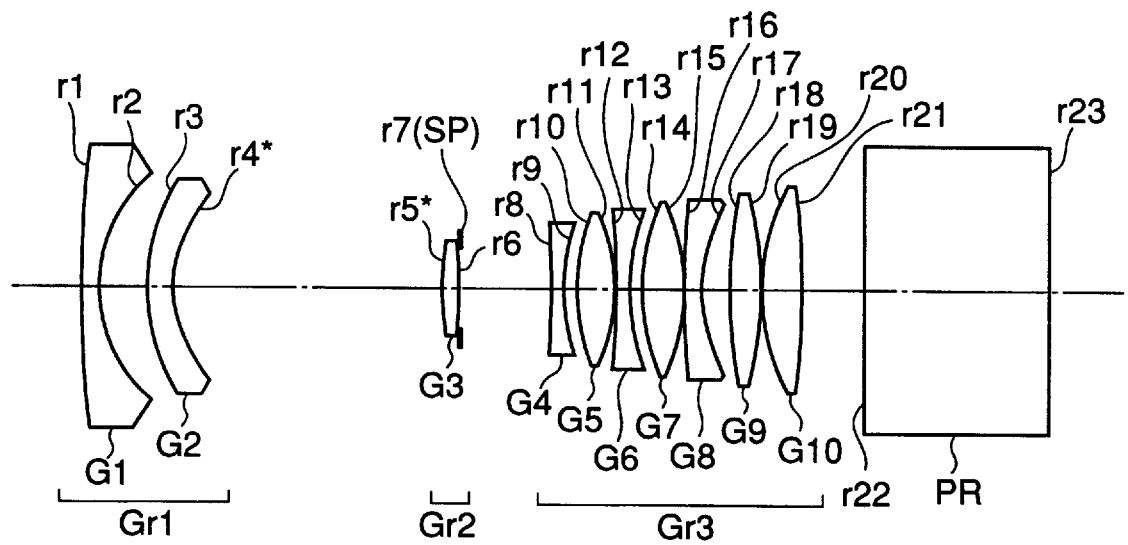
FIG. 3 is a lens arrangement diagram of the projection optical system of a third embodiment (Example 3) of the present invention.
Figure 4:
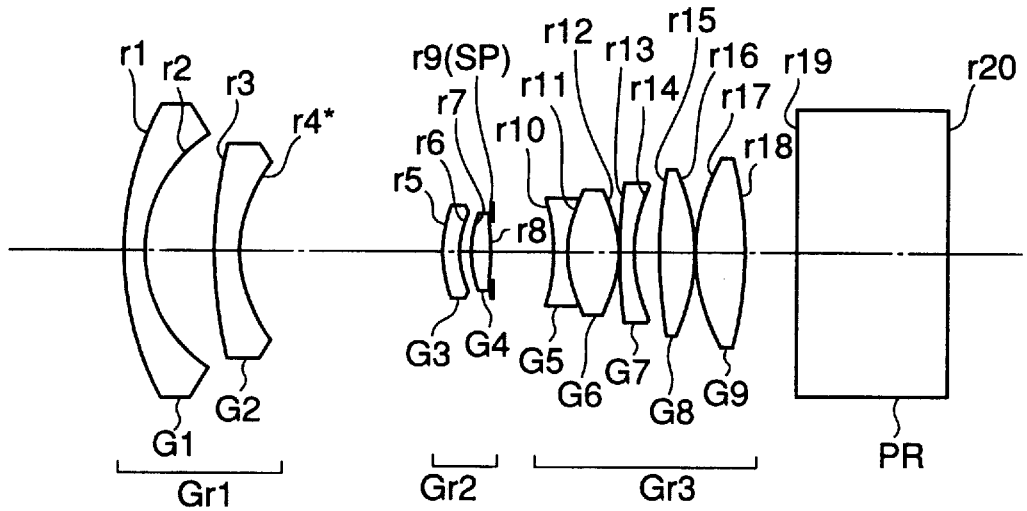
FIG. 4 is a lens arrangement diagram of the projection optical system of a fourth embodiment (Example 4) of the present invention.
Figure 5:
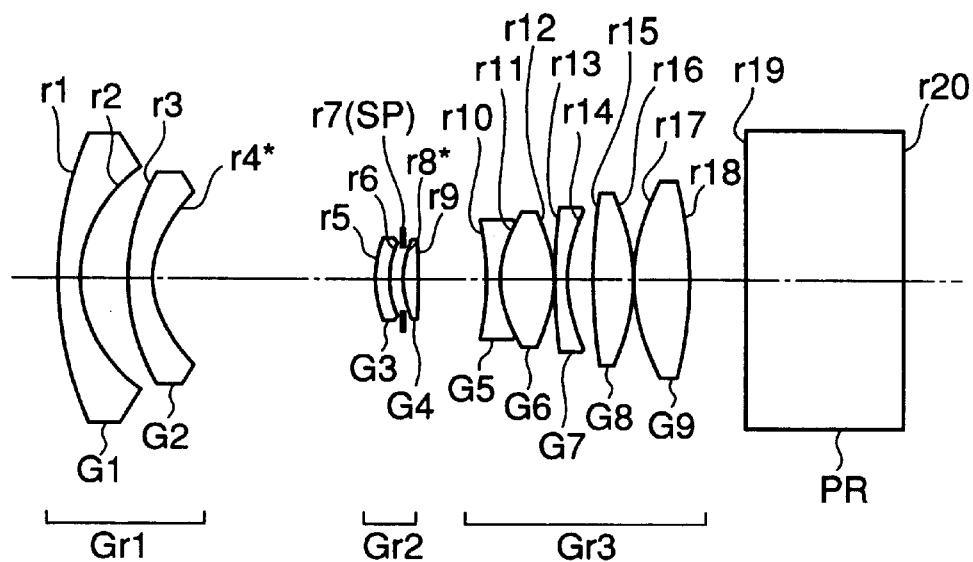
FIG. 5 is a lens arrangement diagram of the projection optical system of a fifth embodiment (Example 5) of the present invention.
Figure 6:
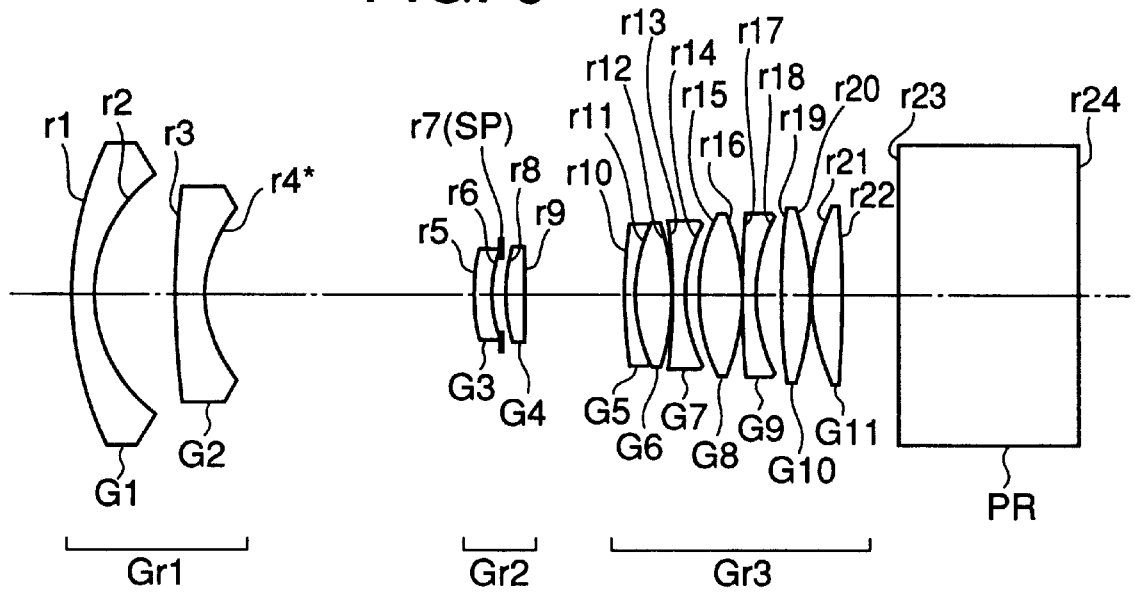
FIG. 6 is a lens arrangement diagram of the projection optical system of a sixth embodiment (Example 6) of the present invention.
Figure 7:
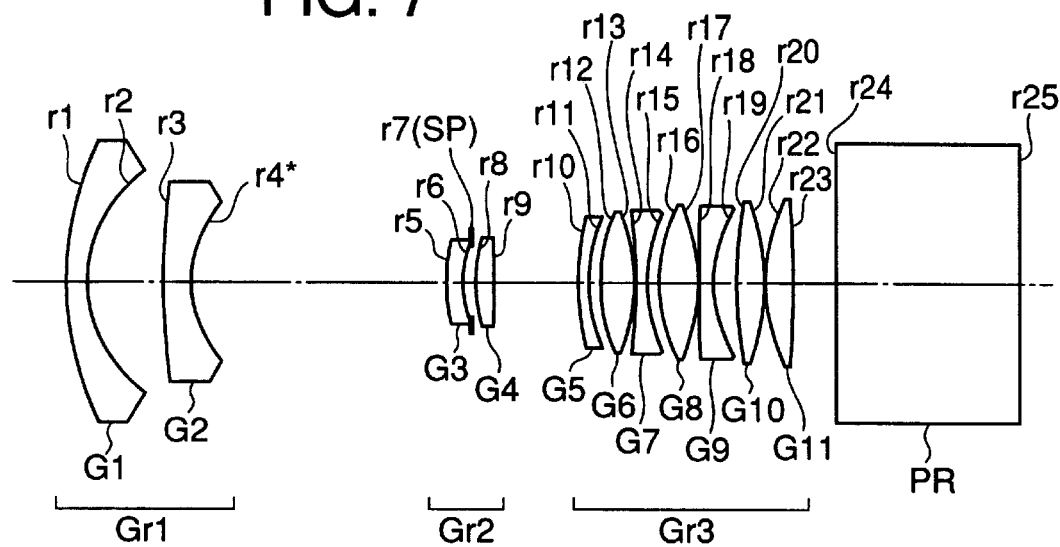
FIG. 7 is a lens arrangement diagram of the projection optical system of a seventh embodiment (Example 7) of the present invention.
Figure 8:
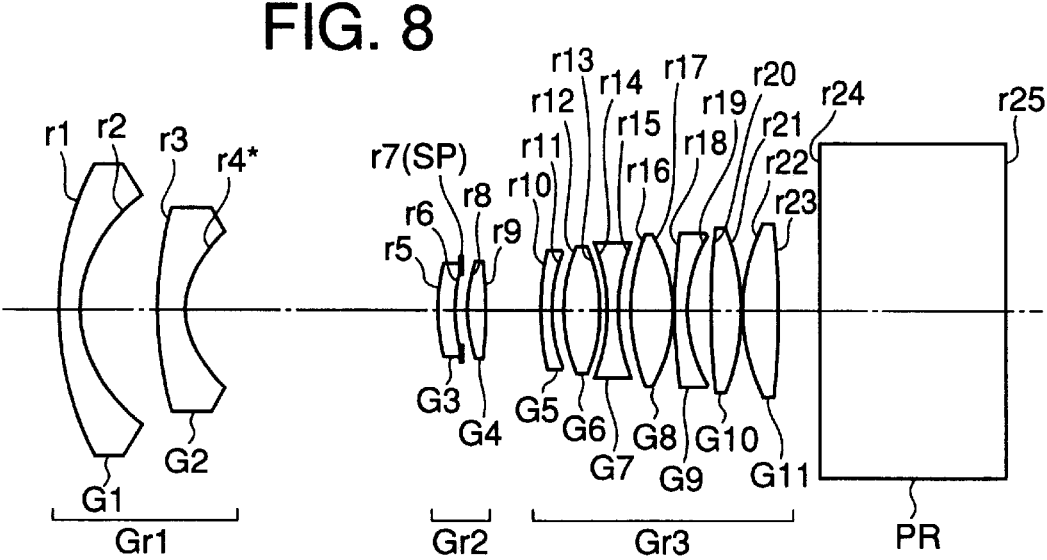
FIG. 8 is a lens arrangement diagram of the projection optical system of an eighth embodiment (Example 8) of the present invention.
Figure 9:
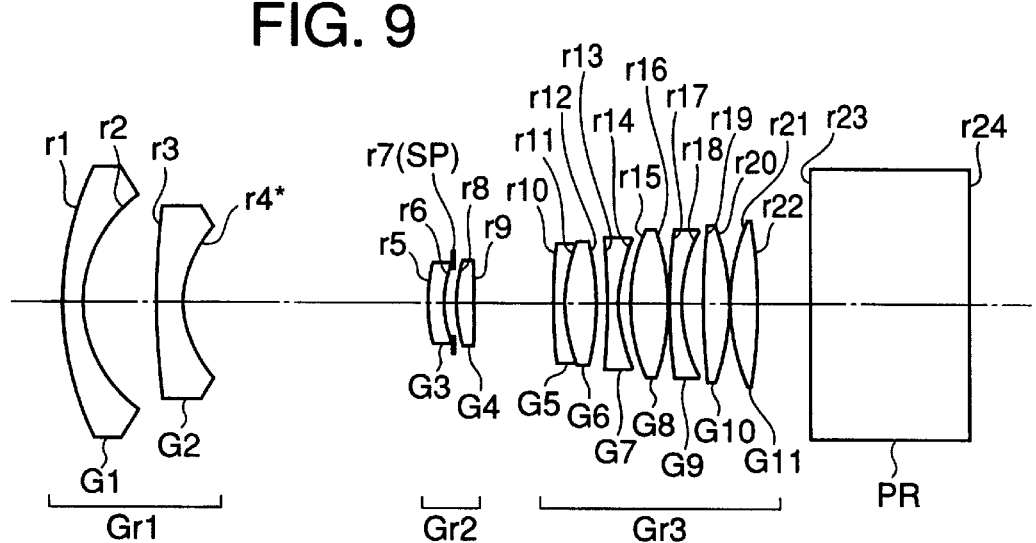
FIG. 9 is a lens arrangement diagram of the projection optical system of a ninth embodiment (Example 9) of the present invention.
Figure 10:
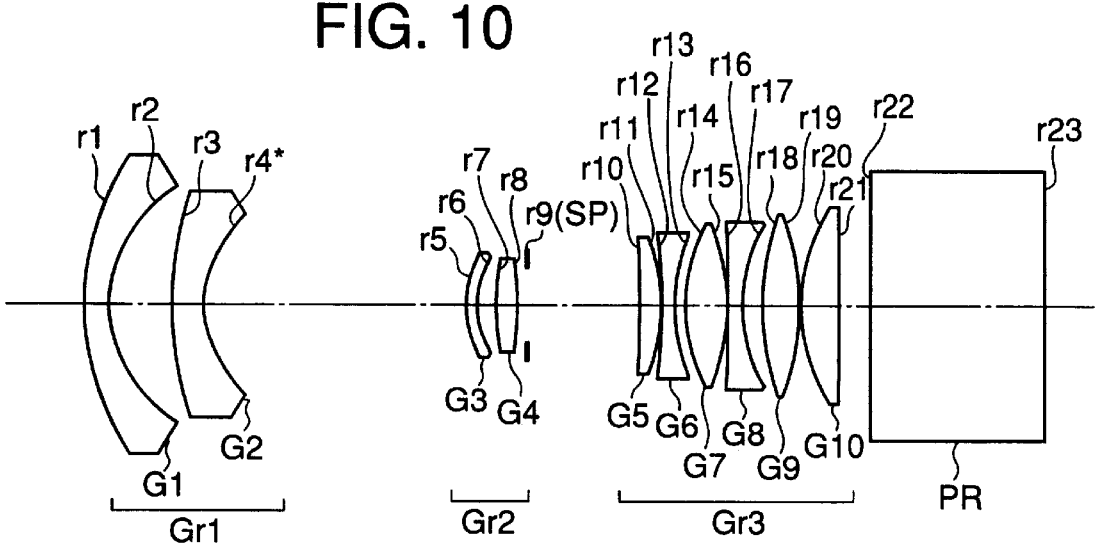
FIG. 10 is a lens arrangement diagram of the projection optical system of a tenth embodiment (Example 10) of the present invention.
Figure 11A:
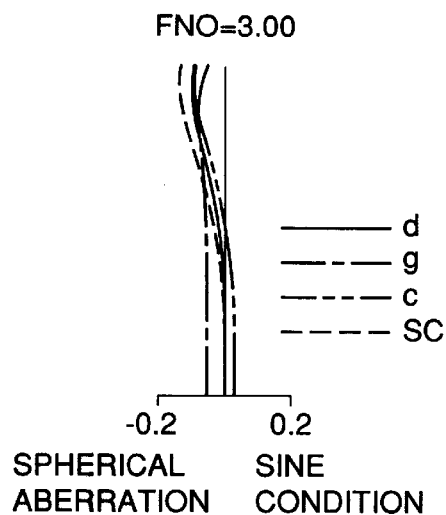
FIGS. 11A to 11C are graphic representations of the aberrations observed in the projection optical system of Example 1.
Figure 11B:
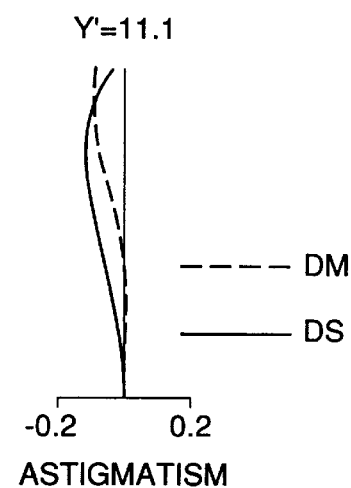
Figure 11C:
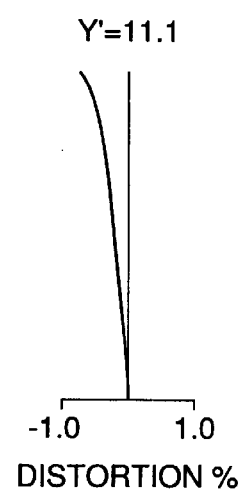
Figure 12A:
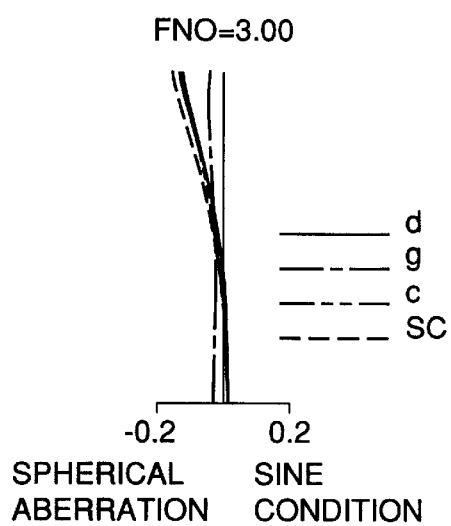
FIGS. 12A to 12C are graphic representations of the aberrations observed in the projection optical system of Example 2.
Figure 12B:
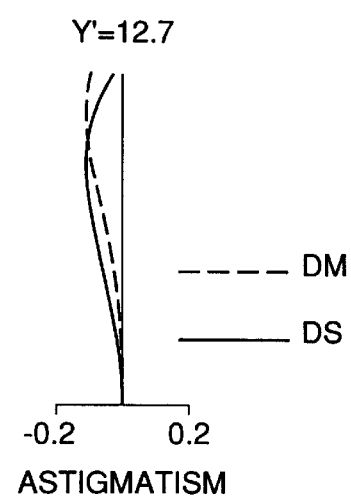
Figure 12C:
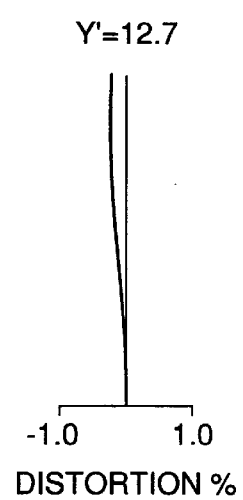
Figure 15A:
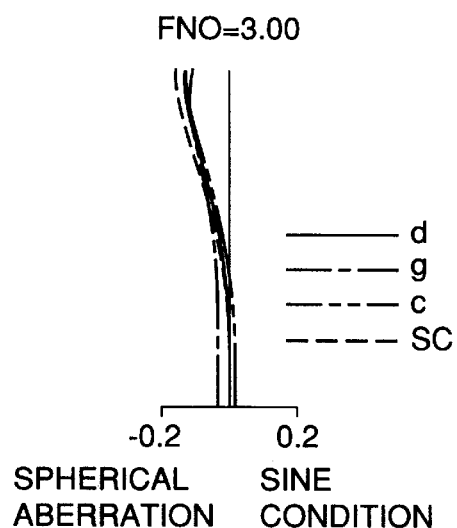
FIGS. 15A to 15C are graphic representations of the aberrations observed in the projection optical system of Example 5.
Figure 15B:
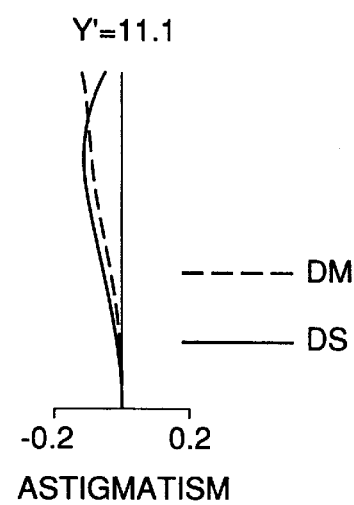
Figure 15C:
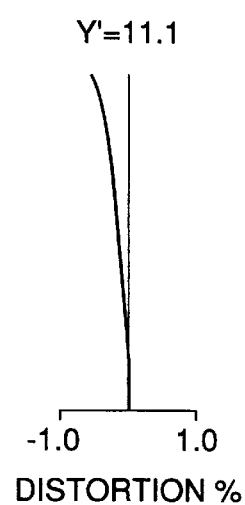
Figure 16A:
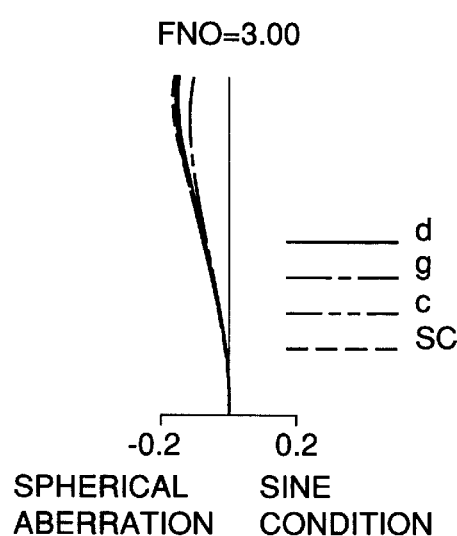
FIGS. 16A to 16C are graphic representations of the aberrations observed in the projection optical system of Example 6.
Figure 16B:
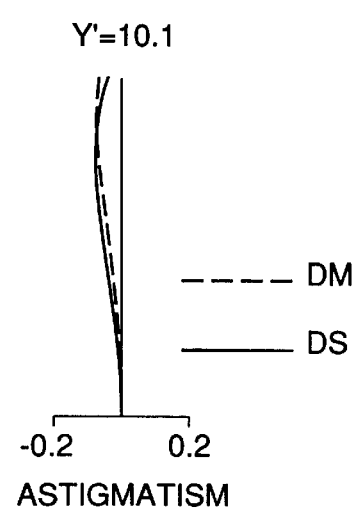
Figure 16C:
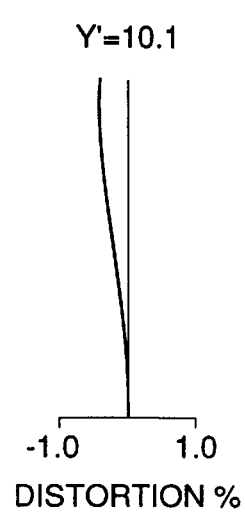
Figure 17A:
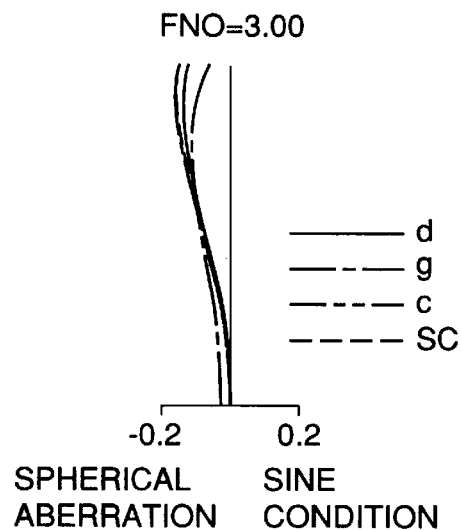
FIGS. 17A to 17C are graphic representations of the aberrations observed in the projection optical system of Example 7.
Figure 17B:
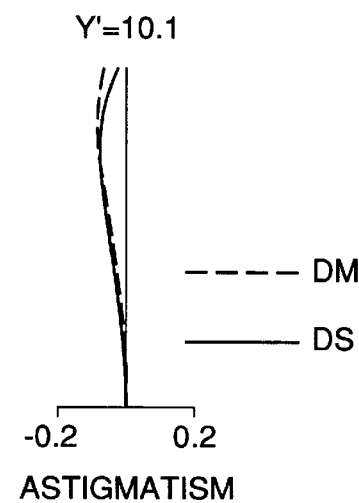
Figure 17C:
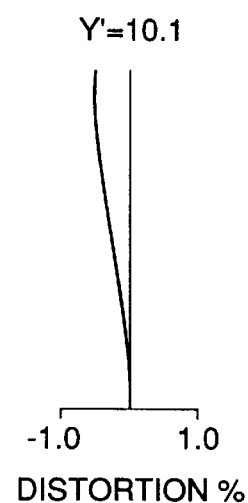
Figure 18A:
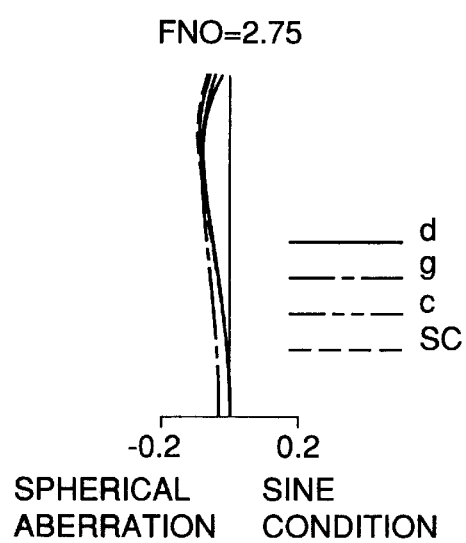
FIGS. 18A to 18C are graphic representations of the aberrations observed in the projection optical system of Example 8.
Figure 18B:
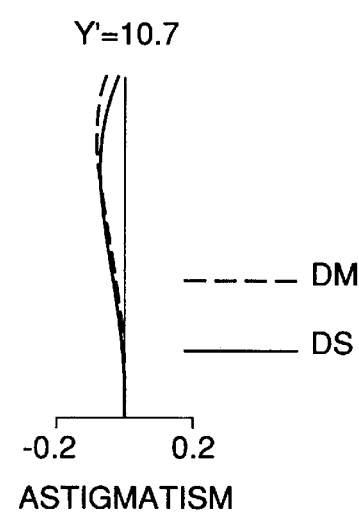
Figure 18C:
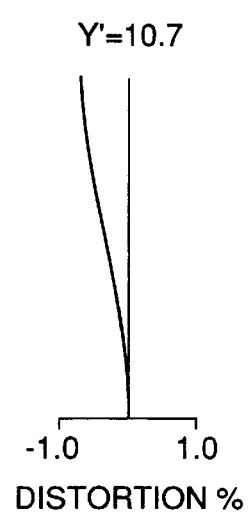
Figure 19A:
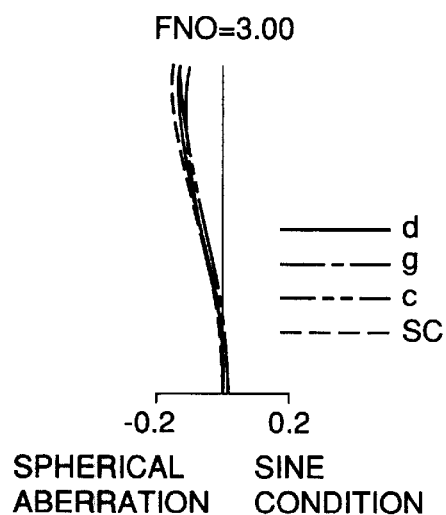
FIGS. 19A to 19C are graphic representations of the aberrations observed in the projection optical system of Example 9.
Figure 19B:
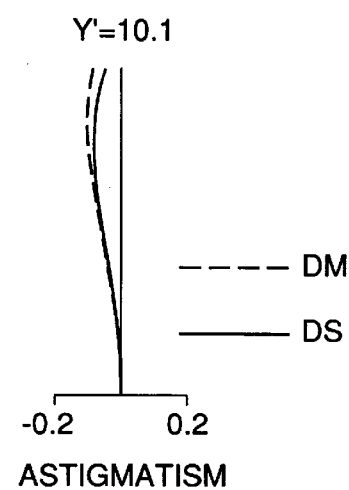
Figure 19C:
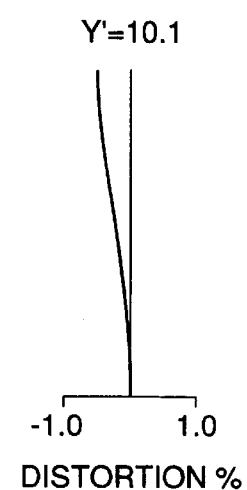
Figure 20A:
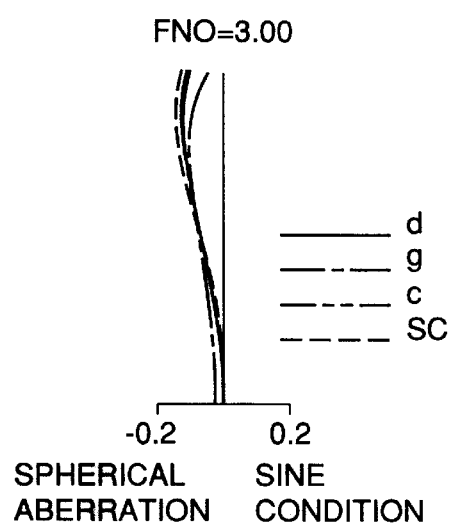
FIGS. 20A to 20C are graphic representations of the aberrations observed in the projection optical system of Example 10.
Figure 20B:
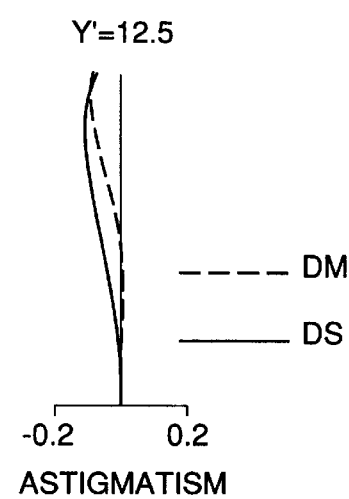
Figure 20C:
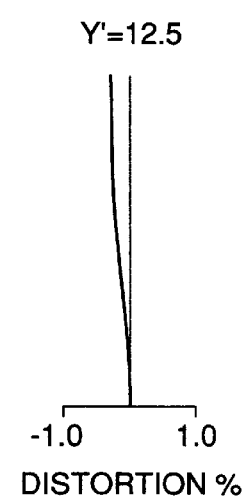

Hereinafter, projection optical systems embodying the present invention will be described with reference to the corresponding drawings. Note that, although all of the embodiments described hereafter are designed as single-focal-length projection optical systems that are suitably used in image projecting apparatuses of a rear-projection type (for example, rear-type liquid crystal projectors), it is needless to say that they are suitably used also as image taking optical systems in image taking apparatuses (for example, video cameras).

FIGS. 1 to 10 are lens arrangement diagrams of the projection optical systems of a first, a second, a third, a fourth, a fifth, a sixth, a seventh, an eighth, a ninth, and a tenth embodiment, respectively. In these diagrams, a surface marked with ri (i=1, 2, 3, . . . ) represents the ith surface counted from the enlargement side (i.e. from the projection side on which a screen is placed) and a surface ri marked with an asterisk (*) is an aspherical surface. In all of the first to tenth embodiments, the projection optical system is built as a single-focal-length projection optical system that is composed of, from the enlargement side, a first lens unit (Gr1) having a negative optical power, a second lens unit (Gr2) having a positive optical power, and a third lens unit (Gr3) having a positive optical power. The first lens unit (Gr1) is composed solely of negative lens elements and includes at least one aspherical surface. The second lens unit (Gr2) includes at least one positive lens element and has an aperture diaphragm (SP) disposed therein, which is located substantially at the position of the front focal point of the third lens unit (Gr3). Moreover, a prism (PR) is disposed on the reduction side (i.e. the display-device side) of the third lens unit (Gr3). This prism (PR) functions equivalently to, for example, a TIR (Total Internal Reflection) prism designed for use in a single-panel image projecting apparatus that employs a DMD, or to a cross dichroic prism designed for use in a three-panel image projecting apparatus that employs a liquid crystal device.

In all of the first to tenth embodiments, the first lens unit (Gr1) is composed of two negative meniscus lens elements (G1 and G2) concave to the reduction side. The reduction-side negative meniscus lens element (G2) has an aspherical surface as its reduction-side surface (r4). In the first to third embodiments, the second lens unit (Gr2) is composed of, from the enlargement side, a single positive lens element (G3) having an aspherical surface (r5) on the enlargement side and an aperture diaphragm (SP). In the fourth and tenth embodiments, the second lens unit (Gr2) is composed of, from the enlargement side, a negative lens element (G3), a positive lens element (G4), and an aperture diaphragm (SP). Moreover, in the fifth to ninth embodiments, the second lens unit (Gr2) is composed of, from the enlargement side, a negative lens element (G3), an aperture diaphragm (SP), and a positive lens element (G4). Note that, in the fifth embodiment, the positive lens element (G4) has an aspherical surface as its enlargement-side surface (r8).

In the first to tenth embodiments, the third lens unit (Gr3) is composed of, from the enlargement side, as follows. In the first embodiment, the third lens unit (Gr3) is composed of a doublet lens element formed by cementing together a negative biconcave lens element (G4) and a positive biconvex lens element (G5), a negative meniscus lens element (G6) concave to the reduction side, and two positive biconvex lens elements (G7 and G8). In the second embodiment, the third lens unit (Gr3) is composed of a doublet lens element formed by cementing together a negative biconcave lens element (G4) and a positive biconvex lens element (G5), a negative biconcave lens element (G6), a positive biconvex lens element (G7), a negative meniscus lens element (G8) concave to the reduction side, and two positive biconvex lens elements (G9 and G10). In the third embodiment, the third lens unit (Gr3) is composed of a negative biconcave lens element (G4), a positive biconvex lens element (G5), a negative biconcave lens element (G6), a positive biconvex lens element (G7), a negative meniscus lens element (G8) concave to the reduction side, and two positive biconvex lens elements (G9 and G10).

In the fourth and fifth embodiments, the third lens unit (Gr3) is composed of a doublet lens element formed by cementing together a negative biconcave lens element (G5) and a positive biconvex lens element (G6), a negative meniscus lens element (G7) concave to the reduction side, and two positive biconvex lens elements (G8 and G9). In the sixth and ninth embodiments, the third lens unit (Gr3) is composed of a doublet lens element formed by cementing together a negative meniscus lens element (G5) concave to the reduction side and a positive biconvex lens element (G6), a negative biconcave lens element (G7), a positive biconvex lens element (G8), a negative meniscus lens element (G9) concave to the reduction side, and two positive biconvex lens elements (G10 and G11). In the seventh and eighth embodiments, the third lens unit (Gr3) is composed of a negative meniscus lens element (G5) concave to the reduction side, a positive biconvex lens element (G6), a negative biconcave lens element (G7), a positive biconvex lens element (G8), a negative meniscus lens element (G9) concave to the reduction side, and two positive biconvex lens elements (G10 and G11). In the tenth embodiment, the third lens unit (Gr3) is composed of a positive meniscus lens element (G5) convex to the reduction side, a negative biconcave lens element (G6), a positive biconvex lens element (G7), a negative biconcave lens element (G8), and two positive biconvex lens elements (G9 and G10).

In a projection optical system composed of three lens units that are, from the enlargement side, a negative, a positive, and a positive lens unit, like the first to tenth embodiments described above, it is preferable that the first lens unit (Gr1) include only a negative lens element and include at least one aspherical surface, that the second lens unit (Gr2) include at least one positive lens element and have an aperture diaphragm (SP) disposed therein, which is located substantially at the position of the front focal point of the third lens unit (Gr3), and that the third lens unit (Gr3) include at least one positive lens element made of a lens material that fulfills Conditions (1) and (2) below.

$$0.015 < \Theta - (0.644 - 0.00168 \cdot vd) < 0.06 \quad (1)$$

$$65 < vd < 100 \quad (2)$$

where $\Theta = (ng-nF)/(nF-nC)$;
$vd = (nd-1)/(nF-nC)$;

ng represents the refractive index for g-line (whose wavelength is 435.84 nm);

nF represents the refractive index for F-line (whose wavelength is 486.13 nm);

nd represents the refractive index for d-line (whose wavelength is 587.56 nm); and nC represents the refractive index for C-line (whose wavelength is 656.28 nm).

Condition (1) quantitatively defines the anomalous partial dispersibility of the used lens material for g-line and F-line as the deviation from the standard line obtained by connecting normal glass (i.e. a deviation from the reference line used to determine a partial dispersion). Specifically, in Condition (1), $\Theta$ represents the partial dispersion ratio of the used lens material between g-line and F-line, and the parenthesized portion represents the partial dispersion ratio obtained by a calculation in the case of normal glass (reference glass) of the same vd (Abbe number). That is, the lens material fulfilling Condition (1) is one generally called anomalous dispersion glass. That the deviation from the standard line (reference line) is greater than 0.015 indicates that the refractive index for g-line is relatively high compared to that of normal glass.

Figure 21:
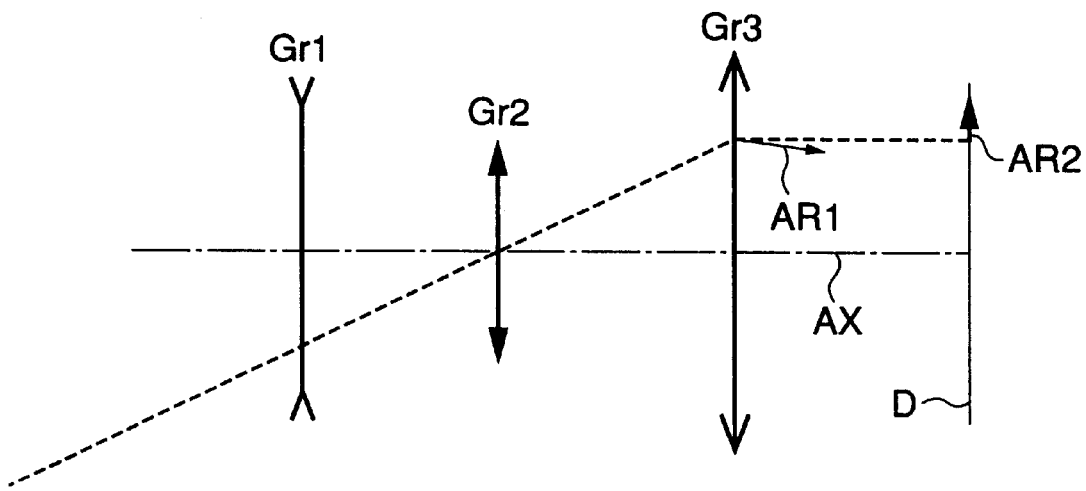
FIG. 21 is a diagram schematically illustrating the principle of how lateral chromatic aberration is corrected in a projection optical system of a negative-positive-positive configuration.

FIG. 21 schematically shows the lens arrangement of a projection optical system of negative, positive, positive configuration. In FIG. 21, the broken line represents the off-axial principal ray. In a conventional projection optical system, when lateral chromatic aberrations for g-line and for C-line are corrected so as to be situated at the same position on the display device surface (D), the position largely shifts toward the outside of the optical axis with respect to d-line. The thick arrow (AR2) on the display device surface (D) represents the lateral chromatic aberration for g-line together with the direction thereof.

The lateral chromatic aberration for g-line as described above is corrected based on the following principle. As in each embodiment, if the positive lens element of the positively-powered third lens unit (Gr3) disposed on the display-device side of the aperture diaphragm (SP) is made of anomalous-dispersion glass, this lens element helps the third lens unit (Gr3) to refract g-line more in the direction indicated by the thin arrow (AR1) in FIG. 21. This effect results from the fact that anomalous-dispersion glass has a higher refractive index for g-line than the normal glass. Consequently, if lateral chromatic aberration for g- and C-lines is corrected by using lens materials that fulfill Condition (1), it is possible to reduce far more effectively the lateral chromatic aberration for g-line that causes g-line to deviate away from the optical axis (AX) than in conventional projection optical systems.

Accordingly, if the value of Condition (1) is less than its lower limit, the lens materials used in the third lens unit (Gr3) have too low anomalous dispersibility, with the result that it is impossible to reduce lateral chromatic aberration sufficiently. In contrast, if the value of Condition (1) is greater than its upper limit, the lens materials will have sufficiently high anomalous dispersibility; however, in general, no lens material having such a high anomalous dispersion is known to exist, and, even if there exists one, its use will require considerable extra cost. On the other hand, if the value of Condition (2) is less than its lower limit, color-related aberrations cannot be corrected sufficiently within the third lens unit (Gr3), with the result that longitudinal chromatic aberration becomes unduly great. In contrast, if the value of Condition (2) is greater than its upper limit, color-related aberrations will be corrected sufficiently within the third lens unit (Gr3), but, in general, no such lens material is known to exist.

The aspherical surface (r4) of the negative lens element (G2) provided in the first lens unit (Gr1) is so shaped as to have an increasingly weak optical power as it becomes farther away from the optical axis (AX). The use of such an aspherical surface makes it possible to correct aberrations such as distortion properly with as few lens elements as possible. This is effective particularly in a wide-angle-oriented lens arrangement fit for use in rear-type projection optical systems. Moreover, by providing an aspherical surface in the first lens unit (Gr1), it is possible to freely control distortion that tends to appear notably in rear-type projection optical systems, and thereby make its correction easier.

Moreover, as described above, the aperture diaphragm (SP) within the second lens unit (Gr2) is located substantially at the position of the front focal point of the third lens unit (Gr3). This arrangement makes it possible to realize an optical system that is telecentric toward the reduction side (i.e. the display device surface (D) side) and simultaneously make the lens diameter of the second lens unit (Gr2) smaller. In an optical system that is telecentric toward the reduction side, the rays that pass through a prism (PR) disposed on the display device surface (D) side of the optical system enter the dichroic surface or the like at uniform angles regardless of their heights on the display device surface (D). This makes it possible to prevent unexpected color shades in images projected onto the screen surface.

In a projection optical system composed of three lens units that are, from the enlargement side, a negative, a positive, and a positive lens unit, like the first to tenth embodiments described above, in which the first lens unit (Gr1) includes only a negative lens element and includes at least one aspherical surface and in which the second lens unit (Gr2) includes at least one positive lens element and has an aperture diaphragm (SP) disposed therein, which is located substantially at the position of the front focal point of the third lens unit (Gr3), it is preferable that at least one of Conditions (3) and (4) below be fulfilled additionally. Moreover, it is more preferable that both of the conditions below be fulfilled.

$$2.5 < f2/f0 < 5 \tag{3}$$

$$2.5 < f12/f0 < 13 \tag{4}$$

where f0 represents the focal length of the entire projection optical system;

f2 represents the focal length of the second lens unit (Gr2); and f12 represents the composite focal length of the first and second lens units (Gr1 and Gr2).

Condition (3) defines the preferable range of the focal length of the second lens unit (Gr2) including an aperture diaphragm (SP) with respect to the entire projection optical system. More specifically, Condition (3) assumes that the focal length of the second lens unit (Gr2) is set at 2.5 to 5 times as the focal length of the entire projection optical system. If the value of Condition (3) is less than its lower limit, the focal length of the second lens unit (Gr2) is so short that the aberrations (in particular, the spherical aberration) occurring in the second lens unit (Gr2) become unduly great. That is, if the value of Condition (3) is less than its lower limit, it is impossible to obtain a brighter F-number in the second lens unit (Gr2), because it is composed of as few lens elements as possible. In other words, to achieve a desired F-number, the second lens unit (Gr2) needs to have a larger number of lens elements. This leads to an undesirable increase in manufacturing cost. In contrast, if the value of Condition (3) is greater than its upper limit, the focal length of the second lens unit (Gr2) is so long that the total length, as well as the back focal distance, of the projection optical system is made unduly long. This makes it impossible to make the entire projection optical system compact, and thus an undesirable increase in manufacturing cost is inevitable. Moreover, if the value of Condition (3) is greater than its upper limit, the Petzval sum shifts in the positive direction, and thus it is extremely difficult to correct curvature of field sufficiently.

Condition (4) defines the preferable range of the composite focal length of the first and second lens units (Gr1 and Gr2) with respect to the entire projection optical system. More specifically, Condition (4) assumes that the composite focal length of the first and second lens units (Gr1 and Gr2) is set at 2.5 to 13 times as the focal length of the entire projection optical system. If the value of Condition (4) is less than its lower limit, the composite focal length of the first and second lens units (Gr1 and Gr2) is so short that the aberrations (here, the distortion and the astigmatic difference, in particular) occurring in the first and second lens units (Gr1 and Gr2) become unduly great. In contrast, if the value of Condition (4) is greater than its upper limit, the composite focal length of the first and second lens units (Gr1 and Gr2) is so long that it is impossible to make the entire projection optical system compact. Specifically, the lens diameter of the first lens unit (Gr1) is unduly large and thus the back focal length is unduly long. At the same time, the lens element made of anomalous-dispersion glass provided in the third lens unit (Gr3) needs to have an unduly large diameter. Consequently, an undesirable increase in manufacturing cost is inevitable.

It is preferable that, as in the first to third embodiments, the second lens unit (Gr2) consist of a single positive lens element (G3) having at least one aspherical surface. The aspherical surface (r5) of the positive lens element (G3) provided in the second lens unit (Gr2) is so shaped as to have an increasingly weak optical power as it becomes farther away from the optical axis (AX). The use of such an aspherical surface makes it possible to correct spherical aberration properly with only a single lens element. Moreover, by composing the second lens unit (Gr2) of a single positive lens element (G3), it is possible to achieve cost reduction.

It is preferable that, as in the fourth to tenth embodiments, the second lens unit (Gr2) be composed solely of two lens elements that are, from the enlargement side, Et negative lens element (G3) and a positive lens element (G4). By composing the second lens unit (Gr2) of a negative and a positive lens element, it is possible to properly correct not only spherical aberration, but also wavelength-by-wavelength difference of spherical aberration.

Note that, in the projection optical systems of the first to tenth embodiments, the lens units are composed solely of refracting lens elements that deflect incoming rays through refraction (i.e., lens elements of the type in which deflection occurs at the interface between two media having different refractive indices). However, the lens units may include, for example, diffracting lens elements that deflect incoming rays through diffraction, refracting-diffracting hybrid-type lens elements that deflect incoming rays through the combined effect of refraction and diffraction, gradient-index lens elements that deflect incoming rays through the index distribution within the medium, or the like.

EXAMPLES

Hereinafter, examples of projection optical systems embodying the present invention will be presented with reference to their construction data, graphic representations of aberrations, and other data. Tables 1 to 10 list the construction data of Examples 1 to 10, which respectively correspond to the first to tenth embodiments described above and have lens arrangements as shown in FIGS. 1 to 10.

In the construction data of each example, ri (i=1, 2, 3, . . . ) represents the radius of curvature of the ith surface counted from the enlargement side (i.e. the projection side), di (i=1, 2, 3, . . . ) represents the ith axial distance counted from the enlargement side, and Ni (i=1, 2, 3, . . . ) and vi (i=1, 2, 3, . . . ) respectively represent the refractive index (nd) for d-line and the Abbe number (vd) of the ith optical element counted from the enlargement side. Also listed are the focal length f0 of the entire projection optical system, the focal length f2 of the second lens unit (Gr2), the composite focal length f12 of the first and second lens units (Gr1 and Gr2), and the F-numbers FNO.

A surface whose radius of curvature ri is marked with an asterisk (*) is an aspherical surface, whose surface shape is defined by Formula (AS) below. Also listed together are the aspherical surface data of each aspherical surface and other data. Moreover, Table 11 lists the values corresponding to the conditions observed in each example.

Formula (AS) provides that:

$$X(H) = (C \cdot H^2)/(1 + \sqrt{1 - \varepsilon \cdot C^2 \cdot H^2}) + (A4 \cdot H^4 + A6 \cdot H^6 + A8 \cdot H^8) \quad (AS)$$

where

X(H) represents the displacement along the optical axis at the height H (relative to the vertex);

H represents the height in a direction perpendicular to the optical axis;

C represents the paraxial curvature;

$\varepsilon$ represents the quadric surface parameter; and

Ai represents the aspherical coefficient of the ith order.

FIGS. 11A to 11C, 12A to 12C, 13A to 13C, 14A to 14C, 15A to 15C, 16A to 16C, 17A to 17C, 18A to 18C, 19A to 19C, and 20A to 20C show aberrations appearing when an object at an infinite distance on the reduction side is observed through the optical systems (each including a prism (PR)) of Examples 1 to 10, respectively. Of these diagrams, FIGS. 11A, 12A, 13A, 14A, 15A, 16A, 17A, 18A, 19A, and 20A show spherical aberration and sine condition; FIGS. 11B, 12B, 13B, 14B, 15B, 16B, 17B, 18B, 19B, and 20B show astigmatism; and FIGS. 11C, 12C, 13C, 14C, 15C, 16C, 17C, 18C, 19C, and 20C show distortion (Y': the maximum image height). In the spherical aberration diagrams, the solid line (d) represents the spherical aberration for d-line, the dash-and-dot line (g) represents the spherical aberration for g-line, the dash-dot-dot line (c) represents the spherical aberration for c-line, and the broken line (SC) represents the sine condition. In the astigmatism diagrams, the broken line (DM) represents the astigmatism for d-line on the meridional plane, and the solid line (DS) represents the astigmatism for d-line on the sagittal plane. Moreover, in the distortion diagrams, the solid line represents the distortion for d-line. Note that, in practical use as a projection optical system in an image projecting apparatus (such as a liquid crystal projector), the projection optical system has the image plane on the screen and has the object plane on the surface (D) of a display device (such as a liquid crystal panel). However, in the above examples, the projection optical system is regarded as i reduction optical system (for example, an image taking optical system) having the object plane on the screen, and its optical performance is evaluated on the display device surface (D).

TABLE 1

Construction Data of Example 1
f0 = 14.0, f2 = 46.849, f12 = 48.929, FNO = 3.0

| Radius of Curvature | Axial Distance | Refractive Index | Abbe Number |
|---|---|---|---|
| <First Lens Unit (Gr1)> | | | |
| r1 = 179.586 | | | |
| | d1 = 3.500 | N1 = 1.48749 | v1 = 70.44 . . . G1 |
| r2 = 22.101 | | | |
| | d2 = 8.000 | | |
| r3 = 31.041 | | | |
| | d3 = 4.500 | N2 = 1.49140 | v2 = 57.82 . . . G2 |
| r4* = 17.683 | | | |
| | d4 = 41.700 | | |
| <Second Lens Unit (Gr2)> | | | |
| r5* = 25.501 | | | |
| | d5 = 2.500 | N3 = 1.80518 | v3 = 25.46 . . . G3 |
| r6 = 75.273 | | | |
| | d6 = 0.500 | | |
| r7 = ∞ (SP) | | | |
| | d7 = 15.000 | | |
| <Third Lens Unit (Gr3)> | | | |
| r8 = −114.056 | | | |
| | d8 = 2.200 | N4 = 1.75520 | v4 = 27.53 . . . G4 |
| r9 = 19.230 | | | |
| | d9 = 8.000 | N5 = 1.61800 | v5 = 63.39 . . . G5 |
| r10 = −34.146 | | | |
| | d10 = 0.300 | | |
| r11 = 76.958 | | | |
| | d11 = 2.000 | N6 = 1.65412 | v6 = 39.62 . . . G6 |
| r12 = 26.263 | | | |
| | d12 = 4.300 | | |
| r13 = 189.654 | | | |
| | d13 = 5.700 | N7 = 1.49700 | v7 = 81.61 . . . G7 |
| r14 = −42.453 | | | |
| | d14 = 0.300 | | |
| r15 = 28.027 | | | |
| | d15 = 9.000 | N8 = 1.49700 | v8 = 81.61 . . . G8 |
| r16 = −119.185 | | | |
| | d16 = 5.000 | | |
| <Prism (PR)> | | | |
| r17 = ∞ | | | |
| | d17 = 27.000 | N9 = 1.51680 | v9 = 64.20 |
| r18 = ∞ | | | |

Aspherical Surface Data of 4th Surface (r4)

$\varepsilon = 0.0$
A4 = −0.86804 × 10$^{-5}$
A6 = −0.32983 × 10$^{-7}$
A8 = 0.12539 × 10$^{-10}$ Aspherical Surface Data of 5th Surface (r5)

$\varepsilon = 1.0000$
A4 = −0.90326 × 10$^{-5}$
A6 = 0.42587 × 10$^{-7}$
A8 = −0.75340 × 10$^{-9}$

TABLE 2

Construction Data of Example 2
f0 = 16.7, f2 = 53.217, f12 = 55.696, FNO = 3.0

| Radius of Curvature | Axial Distance | Refractive Index | Abbe Number |
|---|---|---|---|
| <First Lens Unit (Gr1)> | | | |
| r1 = 192.628 | | | |
| | d1 = 3.100 | N1 = 1.51680 | v1 = 64.20 . . . G1 |
| r2 = 25.931 | | | |
| | d2 = 8.300 | | |

TABLE 2-continued

| Radius of Curvature | Axial Distance | Refractive Index | Abbe Number | |
|---|---|---|---|---|
| r3 = 39.152 | | | | |
| | d3 = 4.400 | N2 = 1.49300 | ν2 = 58.34 | ... G2 |
| r4* = 19.182 | | | | |
| | d4 = 47.000 | | | |
| <Second Lens Unit (Gr2)> | | | | |
| r5* = 53.352 | | | | |
| | d5 = 3.000 | N3 = 1.80358 | ν3 = 25.38 | ... G3 |
| r6 = −210.082 | | | | |
| | d6 = 0.300 | | | |
| r7 = ∞ (SP) | | | | |
| | d7 = 15.700 | | | |
| <Third Lens Unit (Gr3)> | | | | |
| r8 = −294.114 | | | | |
| | d8 = 2.200 | N4 = 1.80518 | ν4 = 25.43 | ... G4 |
| r9 = 54.136 | | | | |
| | d9 = 4.500 | N5 = 1.61800 | ν5 = 63.39 | ... G5 |
| r10 = −66.161 | | | | |
| | d10 = 2.500 | | | |
| r11 = −182.469 | | | | |
| | d11 = 2.400 | N6 = 1.68150 | ν6 = 36.64 | ... G6 |
| r12 = 33.904 | | | | |
| | d12 = 2.400 | | | |
| r13 = 37.908 | | | | |
| | d13 = 8.000 | N7 = 1.49310 | ν7 = 83.58 | ... G7 |
| r14 = −37.908 | | | | |
| | d14 = 0.300 | | | |
| r15 = 128.145 | | | | |
| | d15 = 2.800 | N8 = 1.68150 | ν8 = 36.64 | ... G8 |
| r16 = 32.653 | | | | |
| | d16 = 4.900 | | | |
| r17 = 137.824 | | | | |
| | d17 = 5.600 | N9 = 1.49310 | ν9 = 83.58 | ... G9 |
| r18 = −57.246 | | | | |
| | d18 = 0.300 | | | |
| r19 = 43.413 | | | | |
| | d19 = 7.400 | N10 = 1.49310 | ν10 = 83.58 | ... G10 |
| r20 = −95.205 | | | | |
| | d20 = 10.000 | | | |
| <Prism (PR)> | | | | |
| r21 = ∞ | | | | |
| | d21 = 34.000 | N11 = 1.51680 | ν11 = 64.20 | |
| r22 = ∞ | | | | |

Aspherical Surface Data of 4th Surface (r4)

ε = 0.0
A4 = −0.49130 × $10^{-5}$
A6 = −0.13094 × $10^{-7}$
A8 = 0.12628 × $10^{-12}$

Aspherical Surface Data of 5th Surface (r5)

ε = 1.0000
A4 = −0.40869 × $10^{-5}$
A6 = 0.66663 × $10^{-8}$
A8 = −0.53678 × $10^{-10}$

TABLE 3

Construction Data of Example 3
f0 = 16.7, f2 = 57.331, f12 = 68.876, FNO = 3.0

| Radius of Curvature | Axial Distance | Refractive Index | Abbe Number | |
|---|---|---|---|---|
| <First Lens Unit (Gr1)> | | | | |
| r1 = 199.530 | | | | |
| | d1 = 3.100 | N1 = 1.51680 | ν1 = 64.20 | ... G1 |
| r2 = 26.454 | | | | |
| | d2 = 8.300 | | | |
| r3 = 36.771 | | | | |
| | d3 = 4.400 | N2 = 1.49300 | ν2 = 58.34 | ... G2 |
| r4* = 19.034 | | | | |

TABLE 3-continued

| Radius of Curvature | Axial Distance | Refractive Index | Abbe Number | |
|---|---|---|---|---|
| | d4 = 47.000 | | | |
| <Second Lens Unit (Gr2)> | | | | |
| r5* = 63.951 | | | | |
| | d5 = 3.000 | N3 = 1.80358 | ν3 = 25.38 | ... G3 |
| r6 = −161.322 | | | | |
| | d6 = 0.200 | | | |
| r7 = ∞ (SP) | | | | |
| | d7 = 16.300 | | | |
| <Third Lens Unit (Gr3)> | | | | |
| r8 = −802.787 | | | | |
| | d8 = 2.200 | N4 = 1.68150 | ν4 = 36.64 | ... G4 |
| r9 = 36.592 | | | | |
| | d9 = 2.400 | | | |
| r10 = 41.287 | | | | |
| | d10 = 6.300 | N5 = 1.49310 | ν5 = 83.58 | ... G5 |
| r11 = −35.859 | | | | |
| | d11 = 0.300 | | | |
| r12 = −261.502 | | | | |
| | d12 = 2.400 | N6 = 1.68150 | ν6 = 36.64 | ... G6 |
| r13 = 38.369 | | | | |
| | d13 = 2.400 | | | |
| r14 = 41.327 | | | | |
| | d14 = 7.200 | N7 = 1.49310 | ν7 = 83.58 | ... G7 |
| r15 = −41.327 | | | | |
| | d15 = 0.300 | | | |
| r16 = 242.124 | | | | |
| | d16 = 2.800 | N8 = 1.68150 | ν8 = 36.64 | ... G8 |
| r17 = 32.204 | | | | |
| | d17 = 4.900 | | | |
| r18 = 84.571 | | | | |
| | d18 = 5.500 | N9 = 1.49310 | ν9 = 83.58 | ... G9 |
| r19 = −75.196 | | | | |
| | d19 = 0.300 | | | |
| r20 = 40.282 | | | | |
| | d20 = 7.000 | N10 = 1.49310 | ν10 = 83.58 | ... G10 |
| r21 = −156.717 | | | | |
| | d21 = 11.300 | | | |
| <Prism (PR)> | | | | |
| r22 = ∞ | | | | |
| | d22 = 32.000 | N11 = 1.51680 | ν11 = 64.20 | |
| r23 = ∞ | | | | |

Aspherical Surface Data of 4th Surface (r4)

ε = 0.0
A4 = −0.44192 × $10^{-5}$
A6 = −0.12036 × $10^{-7}$
A8 = −0.99053 × $10^{-12}$

Aspherical Surface Data of 5th Surface (r5)

ε = 1.0000
A4 = −0.52910 × $10^{-5}$
A6 = 0.53240 × $10^{-8}$
A8 = −0.49495 × $10^{-10}$

TABLE 4

Construction Data of Example 4
f0 = 14.0, f2 = 41.714, f12 = 40.452, FNO = 3.0

| Radius of Curvature | Axial Distance | Refractive Index | Abbe Number | |
|---|---|---|---|---|
| <First Lens Unit (Gr1)> | | | | |
| r1 = 56.949 | | | | |
| | d1 = 3.500 | N1 = 1.48749 | ν1 = 70.44 | ... G1 |
| r2 = 24.421 | | | | |
| | d2 = 12.200 | | | |
| r3 = 86.868 | | | | |
| | d3 = 4.500 | N2 = 1.49270 | ν2 = 57.49 | ... G2 |
| r4* = 20.404 | | | | |
| | d4 = 36.000 | | | |

TABLE 4-continued

<Second Lens Unit (Gr2)>

| | | | |
|---|---|---|---|
| r5 = 21.557 | | | |
| | d5 = 3.000 | N3 = 1.80741 | ν3 = 31.59 . . . G3 |
| r6 = 15.241 | | | |
| | d6 = 2.200 | | |
| r7 = 19.987 | | | |
| | d7 = 3.500 | N4 = 1.75000 | ν4 = 25.14 . . . G4 |
| r8 = ∞ | | | |
| | d8 = 0.500 | | |
| r9 = ∞ (SP) | | | |
| | d9 = 10.500 | | |

<Third Lens Unit (Gr3)>

| | | | |
|---|---|---|---|
| r10 = −29.898 | | | |
| | d10 = 2.200 | N5 = 1.75520 | ν5 = 27.51 . . . G5 |
| r11 = 22.237 | | | |
| | d11 = 9.000 | N6 = 1.61800 | ν6 = 63.39 . . . G6 |
| r12 = −23.265 | | | |
| | d12 = 0.300 | | |
| r13 = 117.095 | | | |
| | d13 = 2.500 | N17 = 1.68150 | ν7 = 36.64 . . . G7 |
| r14 = 28.323 | | | |
| | d14 = 4.300 | | |
| r15 = 102.045 | | | |
| | d15 = 6.000 | N8 = 1.49700 | ν8 = 81.61 . . . G8 |
| r16 = −38.473 | | | |
| | d16 = 0.300 | | |
| r17 = 32.282 | | | |
| | d17 = 8.700 | N9 = 1.49700 | ν9 = 81.61 . . . G9 |
| r18 = −71.281 | | | |
| | d18 = 9.000 | | |

<Prism (PR)>

| | | | |
|---|---|---|---|
| r19 = ∞ | | | |
| | d19 = 27.000 | N10 = 1.51680 | ν10 = 64.20 |
| r20 = ∞ | | | |

Aspherical Surface Data of 4th Surface (r4)

ε = 0.0
A4 = −0.64940 × $10^{-5}$
A6 = −0.14838 × $10^{-7}$
A8 = 0.65447 × $10^{-11}$

TABLE 5

Construction Data of Example 5
f0 = 14.0, f2 = 45.189, f12 = 49.624, FNO = 3.0

| Radius of Curvature | Axial Distance | Refractive Index | Abbe Number |
|---|---|---|---|

<First Lens Unit (Gr1)>

| | | | |
|---|---|---|---|
| r1 = 66.288 | | | |
| | d1 = 3.500 | N1 = 1.48749 | ν1 = 70.44 . . . G1 |
| r2 = 22.848 | | | |
| | d2 = 8.000 | | |
| r3 = 35.813 | | | |
| | d3 = 4.500 | N2 = 1.49300 | ν2 = 58.34 . . . G2 |
| r4* = 15.722 | | | |
| | d4 = 37.000 | | |

<Second Lens Unit (Gr2)>

| | | | |
|---|---|---|---|
| r5 = 22.037 | | | |
| | d5 = 2.500 | N3 = 1.83400 | ν3 = 37.34 . . . G3 |
| r6 = 15.205 | | | |
| | d6 = 2.200 | | |
| r7 = ∞ (SP) | | | |
| | d7 = 0.000 | | |
| r8* = 20.985 | | | |
| | d8 = 2.500 | N4 = 1.80358 | ν4 = 25.38 . . . G4 |
| r9 = 630.140 | | | |
| | d9 = 11.500 | | |

TABLE 5-continued

<Third Lens Unit (Gr3)>

| | | | |
|---|---|---|---|
| r10 = −43.196 | | | |
| | d10 = 2.200 | N5 = 1.75520 | ν5 = 27.53 . . . G5 |
| r11 = 19.887 | | | |
| | d11 = 9.000 | N6 = 1.61800 | ν6 = 63.39 . . . G6 |
| r12 = −26.241 | | | |
| | d12 = 0.300 | | |
| r13 = 145.159 | | | |
| | d13 = 2.000 | N7 = 1.68150 | ν7 = 36.64 . . . G7 |
| r14 = 30.380 | | | |
| | d14 = 4.300 | | |
| r15 = 106.267 | | | |
| | d15 = 6.400 | N8 = 1.49310 | ν8 = 83.58 . . . G8 |
| r16 = −40.270 | | | |
| | d16 = 0.300 | | |
| r17 = 32.827 | | | |
| | d17 = 9.500 | N9 = 1.49310 | ν9 = 83.58 . . . G9 |
| r18 = −72.527 | | | |
| | d18 = 9.000 | | |

<Prism (PR)>

| | | | |
|---|---|---|---|
| r19 = ∞ | | | |
| | d19 = 27.000 | N10 = 1.51680 | ν10 = 64.20 |
| r20 = ∞ | | | |

Aspherical Surface Data of 4th Surface (r4)

ε = 0.0
A4 = 0.27414 × $10^{-5}$
A6 = −0.14397 × $10^{-7}$
A8 = −0.34547 × $10^{-10}$

Aspherical Surface Data of 8th Surface (r8)

ε = 1.0000
A4 = 0.16008 × $10^{-5}$
A6 = 0.78596 × $10^{-7}$
A8 = −0.72404 × $10^{-9}$

TABLE 6

Construction Data of Example 6
f0 = 13.6, f2 = 67.525, f12 = 147.46, FNO = 3.0

| Radius of Curvature | Axial Distance | Refractive Index | Abbe Number |
|---|---|---|---|

<First Lens Unit (Gr1)>

| | | | |
|---|---|---|---|
| r1 = 59.162 | | | |
| | d1 = 4.000 | N1 = 1.48749 | ν1 = 70.44 . . . G1 |
| r2 = 26.134 | | | |
| | d2 = 13.200 | | |
| r3 = 153.479 | | | |
| | d3 = 5.000 | N2 = 1.49270 | ν2 = 57.49 . . . G2 |
| r4* = 18.419 | | | |
| | d4 = 45.000 | | |

<Second Lens Unit (Gr2)>

| | | | |
|---|---|---|---|
| r5 = 35.872 | | | |
| | d5 = 3.000 | N3 = 1.85000 | ν3 = 40.04 . . . G3 |
| r6 = 21.190 | | | |
| | d6 = 1.500 | | |
| r7 = ∞ (SP) | | | |
| | d7 = 0.700 | | |
| r8 = 29.378 | | | |
| | d8 = 3.500 | N4 = 1.75520 | ν4 = 27.53 . . . G4 |
| r9 = −178.054 | | | |
| | d9 = 16.500 | | |

<Third Lens Unit (Gr3)>

| | | | |
|---|---|---|---|
| r10 = 90.864 | | | |
| | d10 = 1.900 | N5 = 1.75520 | ν5 = 27.53 . . . G5 |
| r11 = 31.425 | | | |
| | d11 = 6.000 | N6 = 1.61800 | ν6 = 63.39 . . . G6 |

TABLE 6-continued

| Radius of Curvature | Axial Distance | Refractive Index | Abbe Number | |
|---|---|---|---|---|
| r12 = −43.387 | | | | |
| | d12 = 0.300 | | | |
| r13 = −90.100 | | | | |
| | d13 = 2.000 | N7 = 1.68150 | ν7 = 36.64 | ... G7 |
| r14 = 29.709 | | | | |
| | d14 = 2.100 | | | |
| r15 = 33.056 | | | | |
| | d15 = 7.000 | N8 = 1.49310 | ν8 = 83.58 | ... G8 |
| r16 = −40.667 | | | | |
| | d16 = 0.300 | | | |
| r17 = 169.674 | | | | |
| | d17 = 2.400 | N9 = 1.68150 | ν9 = 36.64 | ... G9 |
| r18 = 30.391 | | | | |
| | d18 = 4.100 | | | |
| r19 = 111.899 | | | | |
| | d19 = 5.000 | N10 = 1.49310 | ν10 = 83.58 | ... G10 |
| r20 = −49.645 | | | | |
| | d20 = 0.300 | | | |
| r21 = 40.010 | | | | |
| | d21 = 5.000 | N11 = 1.49310 | ν11 = 83.58 | ... G11 |
| r22 = −189.313 | | | | |
| | d22 = 10.000 | | | |
| <Prism (PR)> | | | | |
| r23 = ∞ | | | | |
| | d23 = 30.000 | N12 = 1.51680 | ν12 = 64.20 | |
| r24 = ∞ | | | | |

Aspherical Surface Data of 4th Surface (r4)

$\epsilon = 0.0$
$A4 = -0.42119 \times 10^{-5}$
$A6 = -0.93369 \times 10^{-8}$
$A8 = 0.56418 \times 10^{-12}$

TABLE 7

Construction Data of Example 7
f0 = 13.6, f2 = 66.832, f12 = 161.672, FNO = 3.0

| Radius of Curvature | Axial Distance | Refractive Index | Abbe Number | |
|---|---|---|---|---|
| <First Lens Unit (Gr1)> | | | | |
| r1 = 59.146 | | | | |
| | d1 = 4.000 | N1 = 1.48749 | ν1 = 70.44 | ... G1 |
| r2 = 26.131 | | | | |
| | d2 = 13.200 | | | |
| r3 = 234.521 | | | | |
| | d3 = 5.000 | N2 = 1.49270 | ν2 = 57.49 | ... G2 |
| r4* = 18.311 | | | | |
| | d4 = 45.000 | | | |
| <Second Lens Unit (Gr2)> | | | | |
| r5 = 28.986 | | | | |
| | d5 = 3.000 | N3 = 1.85000 | ν3 = 40.04 | ... G3 |
| r6 = 20.434 | | | | |
| | d6 = 1.200 | | | |
| r7 = ∞ (SP) | | | | |
| | d7 = 1.000 | | | |
| r8 = 34.655 | | | | |
| | d8 = 3.500 | N4 = 1.75520 | ν4 = 27.53 | ... G4 |
| r9 = −179.597 | | | | |
| | d9 = 15.000 | | | |
| <Third Lens Unit (Gr3)> | | | | |
| r10 = 55.466 | | | | |
| | d10 = 1.900 | N5 = 1.68150 | ν5 = 36.64 | ... G5 |
| r11 = 31.369 | | | | |
| | d11 = 2.000 | | | |
| r12 = 34.655 | | | | |
| | d12 = 6.000 | N6 = 1.49310 | ν6 = 83.58 | ... G6 |
| r13 = −34.368 | | | | |
| | d13 = 0.300 | | | |

TABLE 7-continued

| Radius of Curvature | Axial Distance | Refractive Index | Abbe Number | |
|---|---|---|---|---|
| r14 = −92.901 | | | | |
| | d14 = 2.000 | N7 = 1.68150 | ν7 = 36.64 | ... G7 |
| r15 = 30.965 | | | | |
| | d15 = 2.100 | | | |
| r16 = 31.751 | | | | |
| | d16 = 7.000 | N8 = 1.49310 | ν8 = 83.58 | ... G8 |
| r17 = −39.828 | | | | |
| | d17 = 0.300 | | | |
| r18 = 756.842 | | | | |
| | d18 = 2.400 | N9 = 1.68150 | ν9 = 36.64 | ... G9 |
| r19 = 27.062 | | | | |
| | d19 = 4.100 | | | |
| r20 = 76.470 | | | | |
| | d20 = 5.000 | N10 = 1.49310 | ν10 = 83.58 | ... G10 |
| r21 = −49.975 | | | | |
| | d21 = 0.300 | | | |
| r22 = 37.566 | | | | |
| | d22 = 5.000 | N11 = 1.49310 | ν11 = 83.58 | ... G11 |
| r23 = −235.184 | | | | |
| | d23 = 8.000 | | | |
| <Prism (PR)> | | | | |
| r24 = ∞ | | | | |
| | d24 = 33.000 | N12 = 1.51680 | ν12 = 64.20 | |
| r25 = ∞ | | | | |

Aspherical Surface Data of 4th Surface (r4)

$\epsilon = 0.0$
$A4 = -0.55889 \times 10^{-5}$
$A6 = -0.97883 \times 10^{-8}$
$A8 = 0.36472 \times 10^{-11}$

TABLE 8

Construction Data of Example 8
f0 = 13.6, f2 = 53.392, f12 = 56.077, FNO = 2.7

| Radius of Curvature | Axial Distance | Refractive Index | Abbe Number | |
|---|---|---|---|---|
| <First Lens Unit (Gr1)> | | | | |
| r1 = 60.143 | | | | |
| | d1 = 4.000 | N1 = 1.48749 | ν1 = 70.44 | ... G1 |
| r2 = 26.338 | | | | |
| | d2 = 13.200 | | | |
| r3 = 71.695 | | | | |
| | d3 = 5.000 | N2 = 1.49270 | ν2 = 57.49 | ... G2 |
| r4* = 14.814 | | | | |
| | d4 = 45.000 | | | |
| <Second Lens Unit (Gr2)> | | | | |
| r5 = 36.830 | | | | |
| | d5 = 3.000 | N3 = 1.85000 | ν3 = 40.04 | ... G3 |
| r6 = 22.912 | | | | |
| | d6 = 1.500 | | | |
| r7 = ∞ (SP) | | | | |
| | d7 = 0.700 | | | |
| r8 = 30.072 | | | | |
| | d8 = 3.500 | N4 = 1.75520 | ν4 = 27.53 | ... G4 |
| r9 = −112.407 | | | | |
| | d9 = 10.000 | | | |
| <Third Lens Unit (Gr3)> | | | | |
| r10 = 51.037 | | | | |
| | d10 = 1.900 | N5 = 1.74000 | ν5 = 31.72 | ... G5 |
| r11 = 31.558 | | | | |
| | d11 = 2.000 | | | |
| r12 = 34.655 | | | | |
| | d12 = 6.500 | N6 = 1.49310 | ν6 = 83.58 | ... G6 |
| r13 = −33.461 | | | | |
| | d13 = 1.300 | | | |
| r14 = −32.595 | | | | |
| | d14 = 2.000 | N7 = 1.74000 | ν7 = 31.72 | ... G7 |

TABLE 8-continued

| Radius of Curvature | Axial Distance | Refractive Index | Abbe Number | |
|---|---|---|---|---|
| r15 = 36.697 | | | | |
| | d15 = 2.100 | | | |
| r16 = 40.227 | | | | |
| | d16 = 7.500 | N8 = 1.49310 | ν8 = 83.58 | ... G8 |
| r17 = −30.745 | | | | |
| | d17 = 0.300 | | | |
| r18 = 102.973 | | | | |
| | d18 = 2.400 | N9 = 1.68150 | ν9 = 36.64 | ... G9 |
| r19 = 30.277 | | | | |
| | d19 = 4.100 | | | |
| r20 = 155.890 | | | | |
| | d20 = 5.500 | N10 = 1.49310 | ν10 = 83.58 | ... G10 |
| r21 = −45.887 | | | | |
| | d21 = 0.300 | | | |
| r22 = 38.020 | | | | |
| | d22 = 6.500 | N11 = 1.49310 | ν11 = 83.58 | ... G11 |
| r23 = −147.657 | | | | |
| | d23 = 8.000 | | | |
| <Prism (PR)> | | | | |
| r24 = ∞ | | | | |
| | d24 = 33.000 | N12 = 1.51680 | ν12 = 64.20 | |
| r25 = ∞ | | | | |

Aspherical Surface Data of 4th Surface (r4)

$\epsilon = 0.0$
$A4 = 0.47499 \times 10^{-5}$
$A6 = -0.66618 \times 10^{-8}$
$A8 = -0.17670 \times 10^{-10}$

TABLE 9

Construction Data of Example 9
f0 = 13.6, f2 = 59.084, f12 = 78.344, FNO = 3.0

| Radius of Curvature | Axial Distance | Refractive Index | Abbe Number | |
|---|---|---|---|---|
| <First Lens Unit (Gr1)> | | | | |
| r1 = 59.213 | | | | |
| | d1 = 4.000 | N1 = 1.48749 | ν1 = 70.44 | ... G1 |
| r2 = 26.145 | | | | |
| | d2 = 13.200 | | | |
| r3 = 132.012 | | | | |
| | d3 = 5.000 | N2 = 1.49270 | ν2 = 57.49 | ... G2 |
| r4* = 17.745 | | | | |
| | d4 = 45.000 | | | |
| <Second Lens Unit (Gr2)> | | | | |
| r5 = 35.137 | | | | |
| | d5 = 3.000 | N3 = 1.85000 | ν3 = 40.04 | ... G3 |
| r6 = 21.523 | | | | |
| | d6 = 1.200 | | | |
| r7 = ∞ (SP) | | | | |
| | d7 = 1.000 | | | |
| r8 = 28.429 | | | | |
| | d8 = 3.500 | N4 = 1.75520 | ν4 = 27.53 | ... G4 |
| r9 = −167.639 | | | | |
| | d9 = 14.500 | | | |
| <Third Lens Unit (Gr3)> | | | | |
| r10 = 174.597 | | | | |
| | d10 = 1.900 | N5 = 1.75520 | ν5 = 27.53 | ... G5 |
| r11 = 31.502 | | | | |
| | d11 = 6.000 | N6 = 1.61800 | ν6 = 63.39 | ... G6 |
| r12 = −60.985 | | | | |
| | d12 = 2.300 | | | |
| r13 = −104.500 | | | | |
| | d13 = 2.000 | N7 = 1.74000 | ν7 = 31.72 | ... G7 |
| r14 = 32.501 | | | | |
| | d14 = 2.100 | | | |
| r15 = 37.860 | | | | |
| | d15 = 7.000 | N8 = 1.61800 | ν8 = 63.39 | ... G8 |

TABLE 9-continued

| Radius of Curvature | Axial Distance | Refractive Index | Abbe Number | |
|---|---|---|---|---|
| r16 = −44.780 | | | | |
| | d16 = 0.300 | | | |
| r17 = 115.137 | | | | |
| | d17 = 2.400 | N9 = 1.74000 | ν9 = 31.72 | ... G9 |
| r18 = 31.889 | | | | |
| | d18 = 4.100 | | | |
| r19 = 143.235 | | | | |
| | d19 = 5.000 | N10 = 1.48749 | ν10 = 70.44 | ... G10 |
| r20 = −48.763 | | | | |
| | d20 = 0.300 | | | |
| r21 = 42.427 | | | | |
| | d21 = 5.000 | N11 = 1.48749 | ν11 = 70.44 | ... G11 |
| r22 = −97.679 | | | | |
| | d22 = 10.000 | | | |
| <Prism (PR)> | | | | |
| r23 = ∞ | | | | |
| | d23 = 30.000 | N12 = 1.51680 | ν12 = 64.20 | |
| r24 = ∞ | | | | |

Aspherical Surface Data of 4th Surface (r4)

$\epsilon = 0.0$
$A4 = -0.33182 \times 10^{-5}$
$A6 = -0.68448 \times 10^{-8}$
$A8 = -0.49590 \times 10^{-11}$

TABLE 10

Construction Data of Example 10
f0 = 17.0, f2 = 66.620, f12 = 101.011, FNO = 3.0

| Radius of Curvature | Axial Distance | Refractive Index | Abbe Number | |
|---|---|---|---|---|
| <First Lens Unit (Gr1)> | | | | |
| r1 = 52.995 | | | | |
| | d1 = 4.400 | N1 = 1.48749 | ν1 = 70.44 | ... G1 |
| r2 = 26.161 | | | | |
| | d2 = 12.000 | | | |
| r3 = 74.584 | | | | |
| | d3 = 5.600 | N2 = 1.49270 | ν2 = 57.49 | ... G2 |
| r4* = 18.899 | | | | |
| | d4 = 48.400 | | | |
| <Second Lens Unit (Gr2)> | | | | |
| r5 = 22.837 | | | | |
| | d5 = 2.000 | N3 = 1.80518 | ν3 = 25.43 | ... G3 |
| r6 = 20.030 | | | | |
| | d6 = 3.500 | | | |
| r7 = 61.131 | | | | |
| | d7 = 3.900 | N4 = 1.75690 | ν4 = 29.69 | ... G4 |
| r8 = −113.879 | | | | |
| | d8 = 1.900 | | | |
| r9 = ∞ (SP) | | | | |
| | d9 = 21.100 | | | |
| <Third Lens Unit (Gr3)> | | | | |
| r10 = −269.249 | | | | |
| | d10 = 4.000 | N5 = 1.49700 | ν5 = 81.61 | ... G5 |
| r11 = −37.244 | | | | |
| | d11 = 0.300 | | | |
| r12 = −107.207 | | | | |
| | d12 = 2.400 | N6 = 1.68150 | ν6 = 36.64 | ... G6 |
| r13 = 36.912 | | | | |
| | d13 = 2.000 | | | |
| r14 = 34.173 | | | | |
| | d14 = 7.800 | N7 = 1.49700 | ν7 = 81.61 | ... G7 |
| r15 = −47.562 | | | | |
| | d15 = 0.300 | | | |
| r16 = −265.161 | | | | |
| | d16 = 2.800 | N8 = 1.68150 | ν8 = 36.64 | ... G8 |
| r17 = 31.457 | | | | |
| | d17 = 3.800 | | | |

TABLE 10-continued r18 = 52.182
  d18 = 7.000   N9 = 1.49310   ν9 = 83.58 . . . G9
r19 = −51.292
  d19 = 0.300
r20 = 35.751
  d20 = 7.000   N10 = 1.49310   ν10 = 83.58 . . . G10
r21 = −7249.529
  d21 = 6.000
<Prism (PR)> r22 = ∞
  d22 = 32.500   N11 = 1.51680   ν11 = 64.20
r23 = ∞

Aspherical Surface Data of 4th Surface (r4)

ε = 0.0
A4 = 0.15993 × $10^{-5}$
A6 = −0.75948 × $10^{-8}$
A8 = −0.74659 × $10^{-11}$

TABLE 11

Values Corresponding to Conditions and other data

| Example | Positive lens made of anomalous-dispersion glass in Gr3 | Condition (1) Θ−(0.644−0.00168·νd) | Condition (2) Nd | Condition (3) f2/f0 | Condition (4) f12/f0 | Configuration of Gr2 |
|---|---|---|---|---|---|---|
| 1 | G7,8 | 0.0317 | 81.61 | 3.35 | 3.49 | Positive*/SP |
| 2 | G7,9,10 | 0.0337 | 83.58 | 3.19 | 3.34 | Positive*/SP |
| 3 | G5,7,9,10 | 0.0337 | 83.58 | 3.43 | 4.12 | Positive*/SP |
| 4 | G8,9 | 0.0317 | 81.61 | 2.98 | 2.89 | Negative/Positive/SP |
| 5 | G8,9 | 0.0337 | 83.58 | 3.23 | 3.54 | Negative/SP/Positive* |
| 6 | G8,10,11 | 0.0337 | 83.58 | 4.97 | 10.84 | Negative/SP/Positive |
| 7 | G6,8,10,11 | 0.0337 | 83.58 | 4.91 | 11.89 | Negative/SP/Positive |
| 8 | G6,8,10,11 | 0.0337 | 83.58 | 3.93 | 4.12 | Negative/SP/Positive |
| 9 | — | — | — | 4.34 | 5.76 | Negative/SP/Positive |
| 10 | G9,10 | 0.0337 | 83.58 | 3.92 | 5.94 | Negative/Positive/SP |

What is claimed is:

1. A projection optical system comprising, from an enlargement side to a reduction side:

a first lens unit having a negative optical power and including only a negative lens element, the first lens unit having at least one aspherical surface;

a second lens unit having a positive optical power and including at least one positive lens element;

a third lens unit having a positive optical power and including a lens element; and an aperture diaphragm disposed at a front focal point of the third lens unit, wherein the lens element of the third lens unit fulfills the following conditions:

$$0.015 < \Theta - (0.644 - 0.00168 \cdot \nu d) < 0.06$$

$$65 < \nu d < 100$$

where, $\Theta = (ng-nF)/(nF-nC)$ $\nu d = (nd-1)/(nF-nC)$ ng represents refractive index for g-line (wavelength is 435.84 nm);

nF represents refractive index for F-line (wavelength is 486.13 nm);

nd represents refractive index for d-line (wavelength is 587.56 nm); and nC represents refractive index for C-line (wavelength is 656.28 nm).

2. A projection optical system as claimed in claim 1, wherein the following condition is fulfilled:

$$2.5 < f2/f0 < 5$$

where, f0 represents a focal length of the entire projection optical system; and f2 represents a focal length of the second lens unit.

3. A projection optical system as claimed in claim 1, wherein the following condition is fulfilled:

$$2.5 < f12/f0 < 13$$

where, f0 represents a focal length of the entire projection optical system; and f12 represents a composite focal length of the first and second lens units.

4. A projection optical system as claimed in claim 1, wherein the second lens unit consists of a single positive lens element having an aspherical surface.

5. A projection optical system as claimed in claim 1, wherein the second lens unit consists of, from an enlargement side, a negative lens element and a positive lens element.

6. A projection optical system comprising, from an enlargement side to a reduction side:

a first lens unit having a negative optical power and including only a negative lens element, the first lens unit having at least one aspherical surface;

a second lens unit having a positive optical power and including at least one positive lens element;

a third lens unit having a positive optical power and including a lens element; and an aperture diaphragm disposed at a front focal point of the third lens unit, wherein the lens element of the third lens unit fulfills the following conditions:

$$2.5 < f2/f0 < 5$$
$$2.5 < f12/f0 < 13$$

where, f0 represents a focal length of the entire projection optical system;

f2 represents a focal length of the second lens unit; and f12 represents a composite focal length of the first and second lens units.

7. A projection optical system as claimed in claim 6, wherein the second lens unit consists of a single positive lens element having an aspherical surface.

8. A projection optical system as claimed in claim 6, wherein the second lens unit consists of, from an enlargement side, a negative lens element and a positive lens element.

* * * * *